United States Patent [19]

Usuki et al.

[11] Patent Number: 5,556,707

[45] Date of Patent: Sep. 17, 1996

[54] MAGNETIC RECORDING MEDIUM HAVING A LUBRICANT COMPRISING A PHOSPHORIC ACID MONOESTER AND A FLUOROCARBOXYLIC ACID ESTER

[75] Inventors: Kazuyuki Usuki; Toshio Ishida; Tadashi Yasunaga, all of Odawara, Japan

[73] Assignee: Fuji Photo Film Co., Ltd., Kanagawa, Japan

[21] Appl. No.: 401,999

[22] Filed: Mar. 10, 1995

[30] Foreign Application Priority Data

Mar. 11, 1994 [JP] Japan .................................. 6-041371

[51] Int. Cl.$^6$ ...................................................... G11B 5/72
[52] U.S. Cl. ........................ 428/421; 428/422; 428/457; 428/694 TF; 428/694 TP; 428/900
[58] Field of Search ..................................... 428/421, 422, 428/457, 694 TF, 694 TP, 900

[56] References Cited

U.S. PATENT DOCUMENTS

| | | | |
|---|---|---|---|
| 4,536,444 | 8/1985 | Sumiya et al. | 428/340 |
| 4,537,832 | 8/1985 | Kohmoto et al. | 428/216 |
| 4,735,848 | 4/1988 | Kondo et al. | 428/219 |
| 4,847,156 | 7/1989 | Nishikawa et al. | 428/425.9 |
| 5,268,227 | 12/1993 | Nishikawa et al. | 428/336 |

FOREIGN PATENT DOCUMENTS 63-183607  7/1988  Japan .
4-205712   7/1992  Japan .

*Primary Examiner*—Stevan A. Resan
*Attorney, Agent, or Firm*—Sughrue, Mion, Zinn, Macpeak & Seas

[57] ABSTRACT

A metal thin film type magnetic recording medium which is excellent in running properties, durability and shelf stability. The magnetic recording medium has a ferromagnetic metal thin film formed over a non-magnetic base, and further has on the ferromagnetic metal thin film a lubricant layer containing a phosphoric monoester compound represented by the following formula (1), and an alkylene oxide group-containing fluorinated carboxylic acid ester compound represented by the following formula (2) or (3):

$$R^1\text{—OPO(OH)}_2 \qquad \text{Formula (1)}$$

where $R^1$ is a hydrocarbon group having from 8 to 26 carbon atoms.

$$Rf^1\text{—}R^2\text{—COO—}(R^3O)_n\text{—}R^4 \qquad \text{Formula (2)}$$

$$Rf^2\text{—}R^2\text{—COO—}(R^3O)_n\text{—}R^4\text{—}Rf^3 \qquad \text{Formula (3)}$$

where $Rf^1$, $Rf^2$, $Rf^3$: $(CF_3)_a CF_{3-a}(CF_2)_b$— a: 1 to 3 a+b: 1 to 11 n=1 to 8

$R^2$ is an alkylene or alkenyl group having from 2 to 14 carbon atoms;

$R^3$ is an alkylene group having from 1 to 4 carbon atoms; and $R^4$ is an alkylene group having from 2 to 18 carbon atoms.

5 Claims, No Drawings

MAGNETIC RECORDING MEDIUM HAVING A LUBRICANT COMPRISING A PHOSPHORIC ACID MONOESTER AND A FLUOROCARBOXYLIC ACID ESTER

BACKGROUND OF THE INVENTION

The present invention relates to a magnetic recording medium having a lubricant layer on a magnetic layer or on an inorganic protective layer formed over a magnetic layer. More particularly, the present invention relates to a metal thin film type magnetic recording medium which is excellent in running properties, durability and shelf stability.

Magnetic recording mediums, e.g. magnetic tapes, floppy disks, etc., are commonly coated at the magnetic layer surface thereof with a lubricant to improve lubrication between the magnetic recording medium and the magnetic head and to enhance the running durability of the magnetic recording medium.

With the achievement of high recording density, the magnetic layer surfaces of magnetic recording mediums have become smoother, and the coefficient of friction has become extremely large. Thus, durability concerning the sliding contact with equipment has become a serious problem. Further, magnetic recording mediums are used under various environmental conditions, and information recorded thereon are usually stored for a long period of time ranging from several years to several tens of years. Accordingly, magnetic recording mediums are demanded to have running durability and shelf stability under a wide variety of environmental conditions. Under these circumstances, conventional lubricants have become unable to produce satisfactory effect.

Further, small-sized video tape recorders such as cam coders and 8-mm VTR are often used outdoor. Therefore, magnetic recording mediums are demanded to endure use in a wide range of environmental conditions.

To improve magnetic properties required for high-density magnetic recording, e.g., high-definition recording, digital recording, etc., metal thin film type magnetic recording mediums that use a ferromagnetic metal thin film as a magnetic layer and that are useful for high-density magnetic recording have been expected to replace the conventional magnetic recording mediums. However, in a metal thin film type magnetic recording medium, the magnetic layer is protected by only an extremely thin metallic oxide layer. Therefore, it has been demanded to provide a lubricant layer material which is capable of not only ensuring running properties and durability but also markedly improving shelf stability of metal thin film type magnetic recording mediums. Further, metal thin film type magnetic recording mediums are being improved so as enable achievement of higher-density recording by smoothing the magnetic layer surface and also changing the composition of the magnetic layer from CoNi—O to Co—O or Co—Fe that contains Co—O, etc. so as to attain high coercive force (Bm). With the conventional metal thin film type magnetic recording mediums that have a high cobalt content, however, it has heretofore been difficult obtain stable running properties, durability and corrosion resistance.

Studies have also been conducted of a method for improving durability by forming on the magnetic layer a protective layer of, for example, silica, alumina, titania, graphite, amorphous carbon, cobalt oxide, titanium nitride, chromium carbide, etc. With this method, however, the thickness of the protective layer must be increased in order to obtain satisfactory protective action, resulting in spacing loss. Accordingly, the output reduces, and the achievement of high recording density is hindered, unfavorably.

Under the above-described circumstances, hydrocarbon- or fluorine-containing lubricants which have various structures, and which are excellent in lubricating performance have been examined as being lubricants for metal thin film type magnetic recording mediums, and it is known that an organic fluorine compound having a hydrophilic functional group in a molecule thereof is capable of improving running durability to a considerable extent.

However, even if a lubricant having excellent characteristics is used, a smooth metal thin film type magnetic recording medium having improved electromagnetic transducing characteristics suffers from the problem that the lubricant attached to the surface of the magnetic layer is gradually lost because of repeated sliding movement, resulting in deterioration of the characteristics.

One approach that has heretofore been made to improve the characteristics is to introduce various polar groups into the lubricant. For example, Japanese Patent Application Laid-Open (KOKAI) No. 59-119537 (U.S. Pat. No. No. 4,537,832) and Japanese Patent Application Post-Examination Publication No. 04-50644 disclose a technique in which a carboxyl group, an ester group, and a phosphoric ester are introduced. The disclosed technique involves, however, the problem that repeated running durability at low temperature is inferior. There have also been made many studies to improve the characteristics by using two or more different kinds of lubricant in combination.

Japanese Patent Application Laid-Open (KOKAI) No. 62-141625 discloses the use of a carboxylic acid and a fluorine-containing ester in combination. With this method, the repeated running durability at low temperature can be markedly improved in comparison to a case where each lubricant is used alone. However, the magnetic recording medium using a carboxylic acid and a fluorine-containing ester in combination has the problem that it is inferior in corrosion resistance, particularly shelf stability under high-temperature and high-humidity conditions.

Japanese Patent Application Laid-Open (KOKAI) Nos. 62-236120 (U.S. Pat. No. 4,735,848) and 62-103824 disclose the use of a phosphoric triester or a phosphoric diester and a fluorine-containing ester lubricant. However, since triesters and diesters exhibit weak adsorption to a magnetic film, the wear resistance cannot be improved. Therefore, satisfactory characteristics cannot necessarily be obtained.

Japanese Patent Application Laid-Open (KOKAI) No. 04-205712 proposes a method in which a lubricant layer is formed from two different kinds of lubricant, and in which the amounts of lubricant at the magnetic layer side and at the back coat layer side are specified. With this method, however, no satisfactory lubricating properties can be obtained.

Japanese Patent Application Post-Examination Publication No. 57-29767 and Japanese Patent Application Laid-Open (KOKAI) Nos. 58-188326, 60-63711, 60-63712, 62-209718 and 01-211215 disclose a method in which a lubricant is applied to a back coat layer provided on the side of a magnetic recording medium which is reverse to the side thereof on which a magnetic layer is formed, thereby enabling the lubricant to be appropriately supplied from the back coat layer to the magnetic layer surface where the lubricant is gradually lost by sliding movement. Such a coating method enables an improvement in repeated running durability. However, when a lubricant is coated on only the back coat layer, durability is difficult to ensure; when a lubricant is coated on both the back coat layer and the magnetic layer, a surplus of lubricant is inevitably present on the magnetic layer. Consequently, the coefficient of static friction rises, giving rise to problems such as undesired sticking of the magnetic recording medium.

In terms of corrosion resistance, which is a problem in practical use of magnetic recording mediums that use a ferromagnetic metal thin film as a magnetic layer, the required corrosion resistance cannot sufficiently be ensured by only a fluorine-containing lubricant having a polar group in a molecule thereof. Accordingly, it has been proposed to use such a lubricant in combination with a rust preventive. However, it has heretofore been difficult to ensure the required corrosion resistance by the combined use of a lubricant and a rust preventive that are selected from those which are generally known.

An object of the present invention is to provide a magnetic recording medium which has the coefficient of friction stabilized at a low level, and which is excellent in repeated running durability and corrosion resistance and capable of high-density magnetic recording in particular.

SUMMARY OF THE INVENTION

The present invention provides a magnetic recording medium having a magnetic layer of a ferromagnetic metal thin film formed over a non-magnetic base, wherein the improvement has a lubricant layer containing a phosphoric monoester compound which is represented by the following formula (1), and a fluorine group-containing carboxylic acid ester compound having an alkylene oxide group, which is represented by the following formula (2) or (3), on the magnetic layer or on an inorganic protective layer formed over the magnetic layer:

$$R^1\text{—OPO(OH)}_2 \qquad \text{Formula (1)}$$

where $R^1$ is a hydrocarbon group having from 8 to 26 carbon atoms.

$$Rf^1\text{—}R^2\text{—COO—}(R^3O)_n\text{—}R^4 \qquad \text{Formula (2)}$$

$$Rf^2\text{—}R^2\text{—COO—}(R^3O)_n\text{—}R^4\text{—}Rf^3 \qquad \text{Formula (3)}$$

where $Rf^1$, $Rf^2$, $Rf^3$: $(CF_3)_a CF_3$-a $(CF_2)_b$— a: 1 to 3 a+b: 1 to 11 n=1 to 8

$R^2$ is an alkylene or alkenyl group having from 2 to 14 carbon atoms;

$R^3$ is an alkylene group having from 1 to 4 carbon atoms; and $R^4$ is an alkylene group having from 2 to 18 carbon atoms.

In the above-described magnetic recording medium, an inorganic protective layer may be provided between the ferromagnetic metal thin film and the lubricant layer.

In the above-described magnetic recording medium, a back coat layer may be provided on the side of the non-magnetic base which is reverse to the side on which the ferromagnetic metal thin film is provided. The back coat layer contains the above-described alkylene oxide-containing fluorinated carboxylic acid ester compound.

In the above-described magnetic recording medium, the ferromagnetic metal thin film is formed from a ferromagnetic metal containing not less than 90 at. % cobalt.

DESCRIPTION OF THE PREFERRED EMBODIMENT

The present inventors have found that a magnetic layer having a highly smooth surface and high electromagnetic transducing characteristics can be obtained by providing a lubricant layer which contains a phosphoric monoester compound and a fluorine-containing carboxylic acid ester on the magnetic layer or on an inorganic protective layer formed over the magnetic layer, and further forming a layer in which the fluorine-containing carboxylic acid ester is present on the phosphoric monoester compound, thereby smoothing the surface and further raising the coercive force (Bm) of the magnetic layer material, and that the magnetic layer thus formed exhibits high running durability and shelf stability. Our research conducted thereafter has revealed that, among lubricants used, a fluorine-containing carboxylic acid ester that is liquid at ordinary room temperature is particularly effective in improving still durability and other durability under various environmental conditions, and that such a lubricant exhibits excellent characteristics without precipitating during storage even if the amount of lubricant added to the back coat layer is somewhat increased. Known fluorine-containing carboxylic acid esters which are liquid at ordinary room temperature are those which contain an unsaturated bond in a molecule thereof or have a branched structure, thereby reducing the interaction between molecules. These lubricants exhibit excellent characteristics as described above, but, on the other hand, they have the disadvantage that it is difficult to orient them densely on the magnetic layer or the protective layer after coating because of the weak interaction between molecules. Consequently, the μ value becomes relatively high. Carboxylic acid esters having an unsaturated bond have a problem in terms of long-term shelf stability because the unsaturated bond is readily oxidized in the air.

Under these circumstances, we conducted studies in order to obtain a lubricant free from the above-described disadvantages, and as a result, have found that a lubricant having an alkylene oxide bond in a molecule of a fluorine-containing carboxylic acid ester is liquid at ordinary room temperature, and it exhibits favorably low μ value and superior shelf stability while maintaining excellent characteristics of the liquid lubricant. The present invention has been accomplished on the basis of this finding.

The present invention is a magnetic recording medium which is provided with a lubricant layer that includes a lubricant consisting essentially of a phosphoric monoester compound, and a lubricant consisting essentially of a fluorine-containing carboxylic acid ester having an alkylene oxide group. The phosphoric monoester compound is strongly adsorbed on the magnetic layer and also capable of improving corrosion resistance to a considerable extent. Examples of such phosphoric monoester compounds include monolauryl phosphate, monohexadecyl phosphate, etc.

The hydrophobic chain of the phosphoric monoester compound is preferably a straight-chain saturated hydrocarbon group, but it may be an unsaturated hydrocarbon group, or a hydrocarbon group having a branched structure in which a side chain has been introduced. Regarding the length of the saturated hydrocarbon group, the number of carbon atoms in the main chain is preferably in the range of from 8 to 26. If the number of carbon atoms is smaller than 8, no favorable protective effect can be obtained, whereas, if it is larger than 26, crystallizability increases, causing the coatability to reduce. As a result, the lubricating effect reduces.

In the formula (2) or (3) representing a fluorine compound which is used to produce the magnetic recording medium of the present invention, it is even more preferable that a in $Rf^1$, $Rf^2$ and $Rf^3$ should be from 1 to 2, a+b should be from 1 to 10, and n should be from 1 to 3. Further, $R^2$, $R^3$ $R^4$, $Rf^1$, $Rf^2$ and $Rf^3$ may be branched, and it is even more preferable that $R^2$ should be an alkylene group having from 2 to 10 carbon atoms, $R^3$ should be an alkylene or alkenyl group having from 1 to 4 carbon atoms, and $R^4$ should be an alkylene group having from 3 to 14 carbon atoms.

If $R^2$ is not smaller than 11, the compound cannot readily be adsorbed on the magnetic layer, resulting in a rise in the coefficient of friction. If $R^2$ or $R^3$ exceeds the upper limit of the above range, durability is deteriorated; particularly, the reduction of output increases, unfavorably. If $R^2$ or $R^3$ is not larger than the lower limit of the above range, the solubility of the compound in a solvent becomes insufficient, or the volatility of the compound becomes undesirably high. Consequently, the compound cannot exhibit satisfactory characteristics.

The alkylene oxide group in the fluorine-containing carboxylic acid ester compound of the present invention is capable of lowering the melting point of the ester. Thus, it is possible to obtain uniformity of the coating film and attain favorable running durability under various service environmental conditions. Further, the fluorine-containing carboxylic acid ester compound having an alkylene oxide group is considerably superior in stability to fluorine-containing carboxylic acid ester compounds having an unsaturated bond which have heretofore been known, and hence considered to be capable of maintaining the original characteristics even if it is stored for a long time.

Furthermore, the fluorine-containing carboxylic acid ester compound of the present invention has an alkylene oxide group of specific length which is introduced into the center of a molecule thereof so as to lie adjacent to the ester group, thereby enhancing the adsorption of the molecule to the surface of the magnetic recording medium. Further, since the alkylene oxide group is not so corrosive as an oxo acid in the same way as the ester group, the compound exhibits excellent corrosion resistance. Accordingly, even if the compound is coated in excess to such an extent that there are molecules which are not adsorbed on the surface of the magnetic recording medium, the molecules are less likely to corrode the surface of the magnetic layer or the magnetic head. Further, an alkyl group is bonded adjacently to the alkylene oxide group, thereby weakening corrosiveness due to the hydrophilic nature of the alkylene oxide group, and thus improving the corrosion resistance.

In addition, since both the ester group and the alkylene oxide group display small interaction between molecules, it is easy for the molecules to behave independently. Accordingly, the liquid lubricating properties can be enhanced, and thus the coefficient of friction of the magnetic recording medium can be effectively reduced.

The following are specific examples of fluorine compounds usable for the magnetic recording medium of the present invention:

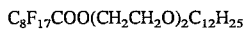

$C_8F_{17}COO(CH_2CH_2O)_2C_{12}H_{25}$

$C_6F_{13}C_8H_{16}COO(CH_2CH_2O)_6C_2H_4C_4F_9$

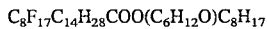

$C_8F_{17}C_{14}H_{28}COO(C_6H_{12}O)C_8H_{17}$

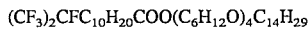

$(CF_3)_2CFC_{10}H_{20}COO(C_6H_{12}O)_4C_{14}H_{29}$

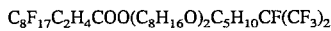

$C_8F_{17}C_2H_4COO(C_8H_{16}O)_2C_5H_{10}CF(CF_3)_2$

These alkylene oxide-containing fluoroalkyl carboxylic acid esters can be obtained by synthesizing a corresponding carboxylic acid chloride and an alkoxy alcohol containing or not containing fluorine in the presence of a base such as triethylamine, and purifying the resulting ester by vacuum distillation or recrystallization.

In the magnetic recording medium of the present invention, the lubricant layer can be formed on the magnetic recording medium surface by either an intermix application method in which a phosphoric monoester compound and a fluorine-containing carboxylic acid ester compound having an alkylene oxide group, which are used as lubricants, are dissolved in an organic solvent, and the resulting solution is coated on the surface of the magnetic recording medium, or a successive application method in which after the phosphoric monoester compound has been coated, the fluorine-containing carboxylic acid ester compound having an alkylene oxide group is coated. However, since the phosphoric monoester compound has excellent adsorptivity, it is preferable to form, first, a lubricant layer of a phosphoric monoester compound and, thereafter, form a lubricant layer of a fluorine-containing carboxylic acid ester compound having an alkylene oxide group.

It is particularly preferable to employ a method in which, after a solution of a phosphoric monoester compound in an organic solvent has been coated on the surface of the magnetic recording medium and dried, a back coat layer containing a lubricant of a fluorine-containing carboxylic acid ester compound having an alkylene oxide group is formed, and then the magnetic recording medium is wound up, thereby transferring the lubricant of the fluorine-containing carboxylic acid ester compound contained in the back coat layer to the surface of the magnetic recording medium. To allow the back coat layer to contain a fluorine-containing carboxylic acid ester compound having an alkylene oxide group, it is possible to employ a method in which a fluorine-containing carboxylic acid ester compound having an alkylene oxide group is coated on the back coat layer prepared in advance, or a method in which, when the back coat layer is to be produced, the back coat layer coating solution is mixed with a fluorine-containing carboxylic acid ester compound having an alkylene oxide group. When a lubricant layer is formed in this way, it is possible to produce an adsorption film having a phosphoric monoester compound densely oriented therein in comparison to a case where a lubricant which consists essentially of a phosphoric monoester compound and a fluorine-containing carboxylic acid ester compound having an alkylene oxide group is coated directly on the surface of the magnetic layer. With the above-described method, it is possible to form a film structure in which the fluorine-containing carboxylic acid ester compound having an alkylene oxide group is mainly present on the adsorption film of the phosphoric monoester compound or between the adsorption films. Such a film structure enables favorable lubricating properties to be attained. Further, since a fluorine-containing carboxylic acid ester compound having an alkylene oxide group has slightly higher adsorptivity than that of a fluorine-containing carboxylic acid ester compound having a similar structure but containing no alkylene oxide group, the compound is readily adsorbed on the surface of the magnetic recording medium, and surplus lubricant can hardly exist on the magnetic recording medium surface. Therefore, the fluorine-containing carboxylic acid ester compound of the present invention shows a favorably low μ value and is unlikely to cause stick-slip or other similar problem in comparison to other fluorine-containing carboxylic acid ester compounds which are liquid at ordinary room temperature.

With the lubricant film having the above-described arrangement, when the magnetic recording medium is run in a VTR, the fluorine-containing carboxylic acid ester compound gradually reduces in amount by sliding contact with the magnetic head and the guide poles, but the fluorine-containing carboxylic acid ester compound contained in the back coat layer is transferred to the surface of the magnetic recording medium when wound up. Therefore, there is substantially no change in the amount of fluorine-containing carboxylic acid ester compound which is present on the surface of the magnetic recording medium. Thus, favorable running durability can be obtained.

With the conventional method, when a fluorine-containing lubricant is coated directly on the surface of the magnetic recording medium by using an organic solvent, even if the lubricant is soluble in the organic solvent, fine coating unevenness and drying unevenness are likely to occur during coating and drying process. With the method in which a fluorine-containing carboxylic acid ester compound is added to the surface of the back coat layer, such coating unevenness is unlikely to occur, and the number of kinds of usable lubricant and organic solvent advantageously increases.

Various generally known methods can be used to apply a phosphoric monoester compound and a fluorine-containing carboxylic acid ester compound having an alkylene oxide group to the magnetic recording medium. For example, when the compounds of the present invention are to be coated on the magnetic recording medium surface in the form of a solution, a wire bar coating method, a gravure coating method, etc. may be used. Since the compounds of the present invention are soluble in ordinary organic solvents, e.g. methyl ethyl ketone, ethanol, etc., the magnetic recording medium can be produced without using a fluorine-containing organic solvent, which is costly and highly destructive of the ozone layer.

The coating weight of the phosphoric monoester compound on the magnetic layer is preferably in the range of from 1 to 20 mg/m$^2$, particularly preferably from 1 to 10 mg/m$^2$. If the coating weight is excessively low, wear resistance becomes insufficient, whereas, if the coating weight is excessively high, problems arise in terms of running properties and durability.

The phosphoric monoester compound is preferably coated on the magnetic layer, but it may be contained in the back coat layer. However, if the proportion in which the phosphoric monoester compound is present in the back coat layer is excessively high, it becomes difficult for the fluorine-containing carboxylic acid ester compound to transfer to the surface of the magnetic recording medium, causing the running durability to be deteriorated.

The amount of the fluorine-containing carboxylic acid ester compound having an alkylene oxide group present on the surface of the magnetic recording medium is preferably in the range of from 1 to 20 mg/m$^2$, particularly preferably from 3 to 10 mg/m$^2$. If the amount of the fluorine-containing carboxylic acid ester compound present on the magnetic recording medium surface is excessively small, the repeated running durability is deteriorated, whereas, if it is excessively large, the coefficient of friction rises. In a case where the fluorine-containing carboxylic acid ester compound having an alkylene oxide group is mixed in the back coat layer or coated on the surface thereof, the amount of the compound present in or on the back coat layer is preferably in the range of from 5 to 40 mg/m$^2$. If the amount of the fluorine-containing carboxylic acid ester compound present in or on the back coat layer is excessively small, the supply of the fluorine-containing carboxylic acid ester compound to the magnetic layer surface becomes insufficient, causing the repeated running durability to be deteriorated. If the amount of the fluorine-containing carboxylic acid ester compound present in or on the back coat layer is excessively large, both the magnetic layer surface and the back coat layer surface undesirably increase in the coefficient of friction.

It is also possible to use another lubricant in combination with the lubricants of the present invention. A lubricant jointly used may be coated directly on the magnetic layer. However, if it is applied to the back coat layer in the same way as the fluorine-containing carboxylic acid ester compound having an alkylene oxide group, the repeated running durability and other properties are even more effectively improved. It is also possible to use a plurality of lubricants in combination with the lubricants of the present invention.

For example, fluorine-containing carboxylic acid esters represented by compounds having the following structures are effective in improving the repeated running durability:

$C_8F_{17}COOC_{18}H_{37}$

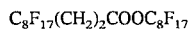

$C_8F_{17}(CH_2)_2COOC_8F_{17}$

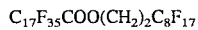

$C_{17}F_{35}COO(CH_2)_2C_8F_{17}$

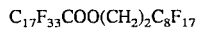

$C_{17}F_{33}COO(CH_2)_2C_8F_{17}$

$C_8F_{17}(CH_2)_{10}COO(CH_2)_2C_8F_{17}$

If a generally known perfluoro polyether is jointly used, still durability and other properties are even more effectively improved. Examples of perfluoro polyethers usable in the present invention include perfluoromethylene oxide, perfluoroethylene oxide polymer, perfluoro-n-propylene oxide polymer $(CF_2CF_2CF_2O)_n$, perfluoroisopropylene oxide polymer $(CF(CF_3)CF_2O)_n$, etc. Perfluoro polyethers used in the present invention may contain a polar group, e.g. an alcohol, a methyl ester group, etc. Specific examples are KRYTOX143AZ and 157SL, manufactured by Du Pont Co., Ltd., FOMBLINZ-DOL and Z-DEAL, manufactured by Montefluos, and so forth. When such a perfluoro polyether is to be coated, it is necessary to use a fluorine-containing organic solvent.

When a perfluoro polyether is to be used, it may be mixed in a back coat layer coating solution in the same way as a fatty ester compound. Alternatively, the perfluoro polyether may be mixed in a fatty ester compound when the compound is to be coated on the back coat layer produced in advance.

If a fluoroalkane in which a part of a hydrocarbon with no functional group introduced therein is replaced by fluorine is jointly used, it is possible to produce a lubricant film by using an ordinary organic solvent, and it is also possible to improve the still durability of the magnetic recording medium.

Although the magnetic recording medium of the present invention has excellent anticorrosion properties, the corrosion resistance can be further enhanced by using a heterocyclic rust preventive in combination with the lubricant. Examples of rust preventives usable in the present invention include nitrogen-containing heterocyclic compounds, e.g. benzotriazole, benzimidazole, purine, pyrimidine, etc., derivatives obtained by introducing an alkyl side chain or the like into the nuclei of these nitrogen-containing heterocyclic compounds, nitrogen- or sulfur-containing heterocyclic compounds, e.g. benzothiazole, 2-mercaptobenzothiazole, a tetrazinedene cyclic compound, a thiouracil cyclic compound, etc., and derivatives of these compounds.

Examples of tetrazinedene cyclic compounds usable for this purpose are those which are represented by the following formula:

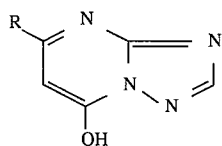

where R is a hydrocarbon group selected from the group consisting of an alkyl group, an alkoxy group, and an alkylamide group.

Tetrazinedene cyclic compounds having from 3 to 26 carbon atoms are particularly preferable. In the case of an alkoxy group, R in ROCOCH$_2$— may be C$_3$H$_7$—, C$_6$H$_{13}$—, or phenyl. In the case of an alkyl group, R may be C$_6$H$_{13}$—, C$_9$H$_{19}$—, or C$_{17}$H$_{35}$—. In the case of an alkylamide group, R in RNHCOCH$_2$— may be phenyl, or C$_3$H$_7$—.

Examples of thiouracil cyclic compounds are those which are represented by the following formula:

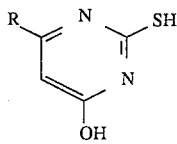

where R is a hydrocarbon group having at least 3 carbon atoms, which may contain a substituent other than carbon and hydrogen.

When a rust preventive is to be used, it may be applied to either the magnetic layer or the back coat layer. In view of the compatibility with running durability and corrosion resistance required to withstand repeated sliding movement, however, addition of a rust preventive to the back coat layer is particularly effective.

The coating weight of the rust preventive is preferably in the range of from 0.1 to 5.0 mg/m$^2$, more preferably from 0.3 to 3 mg/m$^2$.

In the present invention, it is possible to use any magnetic layer which is formed from a known metal or alloy consisting essentially of cobalt by oblique-incidence vacuum deposition in an atmosphere containing a trace of oxygen. To improve electromagnetic transducing characteristics, it is particularly preferable to use Co—O, Co—Fe that contains Co—O,etc., in which not less than 90% of the metal atoms constituting the magnetic layer is cobalt. It is further preferable that not less than 95%, more preferably not less than 97%, of the metal atoms should be cobalt.

The thickness of the magnetic layer is preferably in the range of from 100 nm to 3,000 nm, more preferably from 120 nm to 2,000 nm.

Ferromagnetic metal thin films in which almost all the metal atoms constituting the magnetic layer is cobalt have heretofore been considered to be excellent in magnetic properties but inferior in weathering resistance and unfavorable in terms of running properties and durability in practical use. However, the use of a lubricant layer as in the present invention makes it possible to produce a magnetic recording medium which is excellent in corrosion resistance, running properties and durability, and which is satisfactorily fit for practical use even if the ferromagnetic metal thin film has a chemical composition in which not less than 90% of the metal atoms is cobalt, as described above.

As a non-magnetic base for the magnetic recording medium of the present invention, a synthetic resin film having a thickness of 3 μm to 10 μm is preferably used. Examples include polyethylene terephthalate, polyethylene naphthalate, polyimide, polyamide, and polyamide-imide.

With a view to improving running properties, it is preferable to apply an inorganic filler having a particle diameter of from 50 μm to 200 μm to the surface of the non-magnetic base. The non-magnetic base may also be arranged so that such a filler is contained inside the base, and irregularities are formed on the surface of the base.

To improve electromagnetic transducing characteristics, the non-magnetic base may be formed in a multilayer structure or may have a non-magnetic primary coat layer and an intermediate layer.

If the running durability is insufficient in the present invention, it is preferable to form a known inorganic protective layer, e.g., a carbon film, an oxide film, a nitride film, etc., on the magnetic layer and to form a lubricant layer over the inorganic protective layer. By doing so, the characteristics of the magnetic recording medium can be markedly improved. Such an inorganic protective layer is preferably formed from a carbon film having a structure selected from among amorphous, graphite and diamond structures, and a mixture of these structures. A rigid carbon film, which is generally known as "diamond-like carbon", is particularly preferable. Diamond-like carbon can be produced by a plasma CVD method using hydrocarbon of low molecular weight, e.g., methane, as a raw material, or a sputtering method using a graphite target. In comparison to graphite-like carbon film, diamond-like carbon film exhibits low lubricating properties, but it has high hardness and hence displays exceedingly superior wear resistance when an appropriate lubricant layer is formed thereon.

Since the lubricant layer in the present invention has excellent adsorptivity, it produces satisfactory effect when coated on the above-described inorganic protective layer. However, if the adsorption of the phosphoric monoester compound to the carbon film is insufficient, the surface of the carbon protective film should be treated by argon plasma or oxygen plasma, or exposure to a high-humidity atmosphere, or wet oxidizing treatment. By such surface treatment, the adsorptivity can be improved.

As has been described above, the magnetic recording medium of the present invention has a lubricant layer formed from a phosphoric monoester compound and a fluorine-containing carboxylic acid ester compound, as a fluorine-containing lubricant, which is formed by introducing an alkylene oxide group into an ester, and which is liquid at ordinary room temperature. Thus, the lubricant layer exhibits excellent characteristics of liquid lubricant, together with a favorably low μ value and excellent shelf stability. Further, since alkylene oxide is hydrophilic, the lubricant is adsorptive to the magnetic layer. Accordingly, the film will not be broken even during low-speed running, and the coefficient of friction is reduced. Thus, the lubricant exhibits excellent corrosion resistance. Further, since the alkylene oxide group exhibits no acidic properties, it produces favorable effects without causing head corrosion or other similar problem.

The present invention will be explained below more specifically by way of Examples of the present invention and Comparative Examples.

EXAMPLE

On a polyethylene terephthalate film of 10 μm in thickness having a spherical silica filler of 18 nm in particle diameter, metal cobalt was obliquely deposited at an incidence angle of 45° in an oxygen-containing atmosphere, thereby obtaining a ferromagnetic metal thin film consisting of a stack of two magnetic layers which were made of columnar crystals of ferromagnetic metal such that each layer had a thickness of 70 nm, and the directions of the columnar crystals in the two layers were the same. After the magnetic layer had been uncurled by heat treatment, a methyl ethyl ketone solution of each of compounds A shown in Tables 1 and 2 was coated on the magnetic layer so that the coating weight of the compound A was 18 μmol/m$^2$, and then dried. Subsequently, a resin composition consisting essentially of carbon black and a resin binder was coated on the side of the base which was reverse to the side on which the magnetic layer had been formed, and dried to produce a back coat layer. Next, an isopropanol solution of each of compounds B shown in Tables 1 and 2 was coated on the back coat layer so that the coating weight of the compound B was 12 μmol/m$^2$, and then dried. Thereafter, each magnetic recording medium was slit into a tape of 8 mm in width, thus preparing magnetic recording tapes of sample Nos. 1 to 20.

Next, a magnetic layer was produced in the same way as the above-described samples. Thereafter, a diamond-like carbon film of 10 nm in thickness was formed on the magnetic layer, and then the compounds A and B of sample No. 21 in Table 2 were coated thereon. In addition, a sample having no lubricant applied to either the diamond-like carbon film or the back coat layer was produced as sample No. 22.

Each sample was evaluated by the following methods. The results of the evaluation are shown in Tables 1 and 2. In the tables, "(Comp)" attached to sample Nos. denotes a comparative example.

[Evaluation Method]

① Measurement of coefficient of friction (μ value)

Each sample of magnetic tape was brought into contact with a stainless steel pole (material: SUS420J) at a winding angle of 180° under a tension ($T_1$) of 20 g at 23° C. and 70% RH. A tension ($T_2$) required to run the sample at a speed of 3.3 cm/sec. under the above-described condition was measured, and the friction coefficient μ of the magnetic tape was determined from the following formula on the basis of the measured value:

$$\mu = 1/\pi \cdot \ln(T_2/T_1)$$

② Measurement of still durability

Still A: A color bar image was recorded on each sample tape at a running tension of 20 g by using an 8-mm VTR (FUJIX-M6, a product of Fuji Photo Film Co., Ltd.) under the environmental conditions of 23° C. and 10% RH. Then, the recorded image was reproduced in the still playback mode with the still playback limiting mechanism left inoperative, and a time taken until the playback output reached −6 dB with respect to the initial output was measured to evaluate the still durability.

Still B: A color bar image was recorded on each sample tape by using an 8-mm VTR (FUJIX-V88, a product of Fuji Photo Film Co., Ltd.) at −10° C. Then, the recorded image was reproduced in the still playback mode with the still playback limiting mechanism left inoperative, and a time taken until the playback output reached −6 dB with respect to the initial output was measured to evaluate the still durability.

Still C: Still durability of each sample tape was measured under the conditions for still A after storage for 1 week under the environmental conditions of 60° C. and 50% RH.

③ Evaluation of repeated running durability

Each sample magnetic tape of 60 minutes in length was continuously subjected to 100 running passes for playback by using an 8-mm VTR (SONY CV10, a product of Sony Corporation) under the environmental conditions of 23° C., 10% and 70% RH. After 100 running passes, the output was measured, and the relative value with respect to the initial output was defined as a reduction in the playback output. After the running, the head was observed with a microscope to evaluate head contamination as follows:

⊙ . . . no contamination was observed on either of the sliding and non-sliding contact surfaces of the head;

○ . . . slight contamination was observed on the non-sliding contact surface of the head, although the sliding contact surface was not contaminated;

Δ . . . considerable contamination was observed on the non-sliding contact surface, although the sliding contact surface was not contaminated;

ΔX . . . contamination was observed on the non-sliding contact surface, and slight contamination was also observed on the sliding contact surface; and X . . . contamination was observed on both the sliding and non-sliding contact surfaces.

④ Resistance to corrosion from sulfurous acid gas

Each sample magnetic tape was stored for 72 hours under the environmental conditions of 27° C., 80% RH and sulfurous acid gas content of 1 ppm. After the storage, the surface of the tape was visually observed to evaluate the resistance to corrosion from sulfurous acid gas as follows:

○ . . . there was no substantial change in the luster of the magnetic layer surface during the storage.

Δ . . . corrosion was observed, although metallic luster was left on the whole surface of the tape; and X . . . part or the whole of the magnetic layer was corroded away.

As has been described above, the present invention provides a magnetic recording medium having a magnetic layer of a ferromagnetic metal film formed over a non-magnetic base, in which a lubricant layer is formed over the magnetic layer from a phosphoric monoester compound and a fluorine-containing carboxylic acid ester compound, as a fluorine-containing lubricant, which is formed by introducing an alkylene oxide group into an ester, and which is liquid at ordinary room temperature. Thus, the lubricant layer exhibits excellent characteristics of liquid lubricant, together with a favorably low μ value and excellent shelf stability. Further, since alkylene oxide is hydrophilic, the lubricant is adsorptive to the magnetic layer. Accordingly, the film will not be broken even during low-speed running, and the coefficient of friction is reduced. Thus, the lubricant exhibits excellent corrosion resistance. Further, since the alkylene oxide group exhibits no acidic properties, it produces favorable effects without causing head corrosion or other similar problem. Even if the magnetic layer is made only of cobalt, with which durability or corrosion resistance is difficult to ensure, the magnetic recording medium can exhibit satisfactorily high durability and corrosion resistance.

TABLE 1

| Sample Nos. | Compound A | Compound B | μ value |
|---|---|---|---|
| 1 | $CH_3(CH_2)_{11}OPO_3H_2$ | $CF_3(CF_2)_7CH_2CH_2COO(CH_2CH_2O)_3(CH_2)_{11}CH_3$ | 0.19 |
| 2 | " | $CF_3(CF_2)_7CH_2CH_2COO(CH_2CH_2O)_2(CH_2)_{13}CH_3$ | 0.20 |
| 3 | " | $CF_3(CF_2)_7CH_2CH_2COO(CH_2CH_2O)_5(CH_2)_7CH_3$ | 0.22 |
| Comp 4 | " | $CF_3(CF_2)_7CH_2CH_2COO(CH_2CH_2O)_7(CH_2)_3CH_3$ | 0.29 |
| 5 | " | $CF_3(CF_2)_7CH_2CH_2COO(CH_2CH_2CH_2O)_3(CH_2)_7CH_3$ | 0.20 |
| Comp 6 | " | $CF_3(CF_2)_7CH_2CH_2COO(CH_2CH_2CH_2CH_2O)_3(CH_2)_3CH_3$ | 0.31 |
| 7 | " | $CF_3(CF_2)_7(CH_2)_{10}COO(CH_2CH_2O)_3(CH_2)_{11}CH_3$ | 0.20 |
| 8 | " | $(CF_3)_2CF(CF_2)_4CH_2CH_2COO(CH_2CH_2O)_3(CH_2)_{11}CH_3$ | 0.23 |
| 9 | " | $CF_3(CF_2)_7CH_2CH_2COO(CH_2CH_2O)_3(CH_2)_2(CF_2)_7CF_3$ | 0.23 |
| Comp 10 | " | $CH_3(CH_2)_{10}COO(CH_2CH_2O)_3(CH_2)_{11}CH_3$ | 0.21 |
| Comp 11 | " | $C_{17}H_{33}COO(CH_2)_2(CF_2)_7CF_3$ | 0.22 |
| Comp 12 | " | iso-$C_{17}H_{35}COO(CH_2)_2(CF_2)_7CF_3$ | 0.25 |
| Comp 13 | " | none | 0.29 |
| Comp 14 | none | $CF_3(CF_2)_7CH_2CH_2COO(CH_2CH_2O)_3(CH_2)_{11}CH_3$ | 0.25 |

| | Still | | | 10% run | | $SO_2$ |
|---|---|---|---|---|---|---|
| Sample Nos. | Still A (min) | Still B (min) | Still C (min) | Output (dB) | Head contamination | corrosion resistance |
| 1 | 20 | 15 | 18 | −2.5 | Δ | ○ |
| 2 | 16 | 14 | 18 | −1.9 | Δ | ○ |
| 3 | 18 | 12 | 18 | −2.1 | Δ | ○ |
| Comp 4 | 16 | 9 | 13 | −3.2 | Δ | ○ |
| 5 | 21 | 15 | 21 | −1.5 | Δ | ○ |
| Comp 6 | 9 | 5 | 12 | −3.9 | X | ○ |
| 7 | 25 | 12 | 22 | −2.2 | Δ | ○ |
| 8 | 25 | 14 | 24 | −2.2 | Δ | ○ |
| 9 | 20 | 12 | 24 | −2.6 | Δ | ○ |
| Comp 10 | 4 | 1 | 5 | −5.9 | X | ○ |
| Comp 11 | 15 | 11 | 4 | −2.9 | Δ | ○ |
| Comp 12 | 12 | 1 | 10 | −1.9 | Δ | ○ |
| Comp 13 | 3 | 1 | 3 | <−6 | X | ○ |
| Comp 14 | 7 | 1 | 5 | −4.1 | X | Δ |

TABLE 2

| Sample Nos. | Compound A | Compound B | μ value |
|---|---|---|---|
| 15 | $CH_3(CH_2)_{17}OPO_3H_2$ | $CF_3(CF_2)_7CH_2CH_2COO(CH_2CH_2O)_3(CH_2)_{11}CH_3$ | 0.21 |
| 16 | $CH_3(CH_2)_7OPO_3H_2$ | $CF_3(CF_2)_7CH_2CH_2COO(CH_2CH_2O)_3(CH_2)_{11}CH_3$ | 0.23 |
| Comp 17 | $CH_3(CH_2)_5OPO_3H_2$ | $CF_3(CF_2)_7CH_2CH_2COO(CH_2CH_2O)_3(CH_2)_{11}CH_3$ | 0.27 |
| Comp 18 | $(CH_3(CH_2)_{17}O)_2PO_2H_2$ | $CF_3(CF_2)_7CH_2CH_2COO(CH_2CH_2O)_3(CH_2)_{11}CH_3$ | 0.29 |
| Comp 19 | $(CH_3(CH_2)_{17}O)_3PO$ | $CF_3(CF_2)_7CH_2CH_2COO(CH_2CH_2O)_3(CH_2)_{11}CH_3$ | 0.33 |
| Comp 20 | $CH_3(CH_2)_{16}COOH$ | $CF_3(CF_2)_7CH_2CH_2COO(CH_2CH_2O)_3(CH_2)_{11}CH_3$ | 0.21 |
| 21 | $CH_3(CH_2)_{11}OPO_3H_2$ | $CF_3(CF_2)_7CH_2CH_2COO(CH_2CH_2O)_3(CH_2)_{11}CH_3$ | 0.23 |
| Comp 22 | none | none | 0.51 |

TABLE 2-continued

| Sample Nos. | Still A (min) | Still B (min) | Still C (min) | 10% run Output (dB) | Head contamination | $SO_2$ corrosion resistance |
|---|---|---|---|---|---|---|
| 15 | 19 | 12 | 17 | −3.1 | Δ | ○ |
| 16 | 17 | 11 | 19 | −2.8 | Δ | ○ |
| Comp 17 | 9 | 5 | 5 | <−6 | X | ○ |
| Comp 18 | 5 | 2 | 4 | <−6 | X | Δ |
| Comp 19 | 7 | 2 | 10 | <−6 | X | X |
| Comp 20 | 5 | 2 | 5 | −2.9 | Δ | ○ |
| 21 | >30 | >30 | >30 | −2.0 | Δ | ○ |
| Comp 22 | 5 | 1 | <−6 | −2.9 | X | X |

What we claim is:

1. A magnetic recording medium having a ferromagnetic metal thin film formed over a non-magnetic base, wherein the improvement comprises a lubricant layer provided over the ferromagnetic metal thin film, said lubricant layer containing a phosphoric monoester compound which is represented by the following formula (1), and an alkylene oxide group-containing fluorinated carboxylic acid ester compound which is represented by the following formula (2) or (3):

$$R^1\text{—OPO(OH)}_2 \qquad \text{Formula (1)}$$

where $R^1$ is a hydrocarbon group having from 8 to 26 carbon atoms;

$$Rf^1\text{—}R^2\text{—COO—}(R^3O)_n\text{—}R^4 \qquad \text{Formula (2)}$$

$$Rf^2\text{—}R^2\text{—COO—}(R^3O)_n\text{—}R^4\text{—}Rf^3 \qquad \text{Formula (3)}$$

where $Rf^1$, $Rf^2$, $Rf^3$: $(CF_3)_a CF_{3-a}(CF_2)_b$— a: 1 to 3 a+b: 1 to 11 n=1 to 8

$R^2$ is an alkylene or alkenyl group having from 2 to 14 carbon atoms;

$R^3$ is an alkylene group having from 1 to 4 carbon atoms; and $R^4$ is an alkylene group having from 2 to 18 carbon atoms.

2. A magnetic recording medium according to claim 1, further comprising an inorganic protective layer which is provided between said ferromagnetic metal thin film and said lubricant layer.

3. A magnetic recording medium according to claim 1 or 2, further comprising a back coat layer which is provided on a side of said non-magnetic base which is reverse to a side thereof on which said ferromagnetic metal thin film is provided, said back coat layer containing said alkylene oxide-containing fluorinated carboxylic acid ester compound.

4. A magnetic recording medium according to claim 1 or 2, wherein said ferromagnetic metal thin film is formed from a ferromagnetic metal containing not less than 90 at. % cobalt.

5. A magnetic recording medium according to claim 3, wherein said ferromagnetic metal thin film is formed from a ferromagnetic metal containing not less than 90 at. % cobalt.

* * * * *